United States Patent
Hegar et al.

(10) Patent No.: US 11,646,957 B1
(45) Date of Patent: May 9, 2023

(54) NETWORK PACKET LOSS PERIOD EXPANSION

(71) Applicant: Amazon Technologies, Inc., Seattle, WA (US)

(72) Inventors: Ryan Hegar, Happy Valley, OR (US); Ronan Waide, Dublin (IE); John William Evans, Somer (GB)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 17/112,161

(22) Filed: Dec. 4, 2020

(51) Int. Cl.
*H04L 43/08* (2022.01)
*H04L 43/0829* (2022.01)
*H04L 47/27* (2022.01)
*H04L 49/552* (2022.01)
*H04L 43/022* (2022.01)

(52) U.S. Cl.
CPC ........ *H04L 43/0835* (2013.01); *H04L 43/022* (2013.01); *H04L 47/27* (2013.01); *H04L 49/552* (2013.01)

(58) Field of Classification Search
CPC ............... H04L 43/0835; H04L 43/022; H04L 47/27; H04L 49/552
See application file for complete search history.

(56) References Cited

U.S. PATENT DOCUMENTS

| | | | | |
|---|---|---|---|---|
| 10,516,616 | B2 * | 12/2019 | Lopez Serrano | ..... H04L 47/122 |
| 10,986,027 | B1 * | 4/2021 | Sears | .................. H04L 12/4641 |
| 11,140,205 | B2 * | 10/2021 | Nilsson | .................. H04L 69/326 |
| 11,159,834 | B2 * | 10/2021 | Nilsson | ............ H04N 21/23805 |
| 2015/0236966 | A1 * | 8/2015 | Francini | .................. H04L 43/16 370/235 |
| 2017/0195231 | A1 * | 7/2017 | Lopez Serrano | ....... H04W 8/04 |
| 2020/0348662 | A1 * | 11/2020 | Cella | .................... H04B 17/309 |
| 2021/0157312 | A1 * | 5/2021 | Cella | ................. G05B 23/0289 |
| 2022/0108262 | A1 * | 4/2022 | Cella | ............. G06Q 10/063118 |

FOREIGN PATENT DOCUMENTS

| | | | | |
|---|---|---|---|---|
| CN | 111919423 | A | * 11/2020 | |
| CN | 111542089 | B | * 11/2021 | ........ H04W 28/0289 |
| GB | 2559271 | A | * 8/2018 | ........... H04L 47/193 |
| WO | WO-2018114519 | A1 | * 6/2018 | ......... H04L 43/0829 |

* cited by examiner

*Primary Examiner* — Mounir Moutaouakil
(74) *Attorney, Agent, or Firm* — Klarquist Sparkman, LLP

(57) ABSTRACT

Technologies are provided for analyzing packet loss in network packet streams using windowed loss durations. A computing device can be configured to detect a first loss period in a network packet stream and a second, subsequent loss period in the network packet stream. The computing device can determine a number of packets received in the stream between the two loss periods, and can compare this number of packets to a specified recovery window length. If the number of packets received between the two loss periods is less than the recovery window length, then the computing device can treat the two loss periods, and the packets received between the two loss periods, as a single period of packet loss. The packet loss period can be treated as a single loss event for the purposes of analyzing network packet stream quality of experience and/or tuning packet loss compensation mechanisms.

16 Claims, 6 Drawing Sheets

NETWORK PACKET LOSS PERIOD EXPANSION

BACKGROUND

At least some computer network systems track packet loss in data streams transmitted through the computer network system. For example, some such systems can detect loss periods, or points in a data stream where the stream transitions from successful receipt to packet loss. At least some such systems can also track a loss distance, or a number of packets received in a stream between successive loss periods.

DETAILED DESCRIPTION

Figure 1:
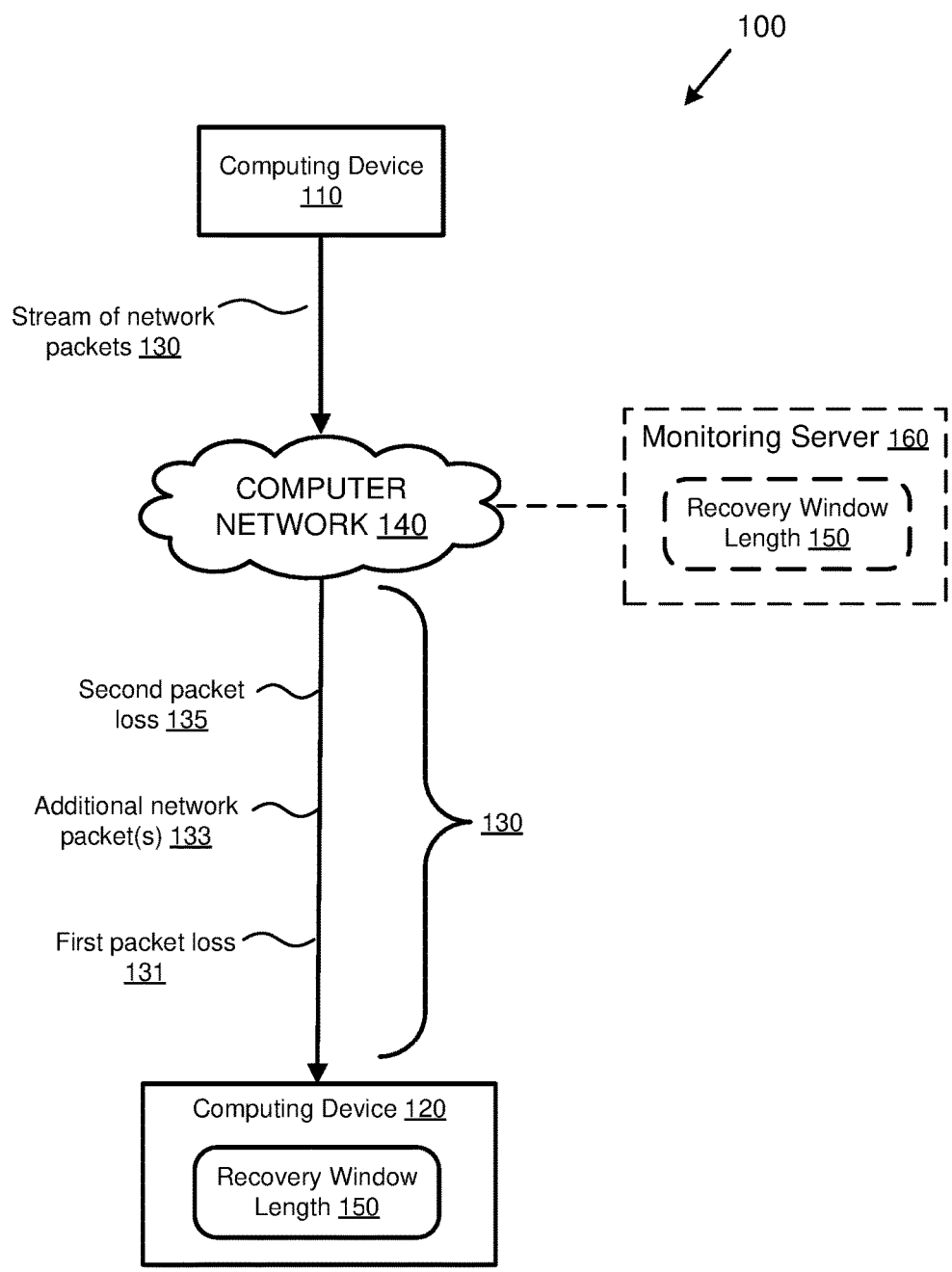
FIG. 1 is a system diagram depicting an example system configured to monitor a stream of network packets using packet loss period expansion.

The following description is directed to technologies for monitoring network packet streams using windowed loss durations. A computing device connected to a computer network can be configured to detect loss periods in a network packet stream and to track a loss distance, or a number of packets received in a stream between two loss periods. Network packet loss can impact quality of experience of customers and/or services using a network. Measures of loss periods and loss distances can be used to assess the quality of experience for a given computer network.

However, in at least some cases, measurements of loss periods and loss durations are not sufficient to accurately assess the impact of packet loss on the quality of experience for network packet streams. For example, in a scenario where a packet stream experiences frequent, short periods of loss, current network monitoring techniques may not detect the loss as significant since the durations of the loss periods may appear as relatively small compared to the loss distances between the periods of loss. However, such "bursts" of short loss periods can significantly impact the quality of experience for certain data streams, such as video and audio data streams. Also, correct tuning of packet loss compensation mechanisms, such as error correction techniques (like forward error correction) and temporal separation of redundant data streams, can be difficult or impossible using current packet loss measurements. For example, when bursts of several short loss periods are encountered, current network monitoring techniques may treat the loss periods as independent and, thus, may not detect the overall burst of several short loss periods as a single phenomenon. Tuning packet loss compensation mechanisms based on this incomplete picture of the packet loss may lead to less than desirable results.

At least some of the embodiments of the technologies described herein solve these problems by treating successive loss periods in a network packet stream, and intervening packets between the successive loss periods, as a single windowed loss duration. A computing device or monitoring server can be configured to detect a first loss period in a network packet stream and a second, subsequent loss period in the network packet stream. The computing device or monitoring server can determine a number of packets received in the stream between the two loss periods and compare this number of packets to a specified recovery window length. If the number of packets received between the two loss periods is less than the recovery window length, then the computing device or monitoring server can treat the two loss periods, and the packets received between the two loss periods, as a single windowed loss duration. The computing device or monitoring server can report the windowed loss duration as a single loss event, instead of treating the two loss periods as separate loss events. Thus, in at least some cases, bursts of short loss periods can be detected and treated as single loss events for the purposes of analyzing network packet stream quality of experience and/or tuning packet loss compensation mechanisms, such as error correction techniques and temporal spacing for redundant data streams.

This technique can extend to subsequent loss periods as well. For example, if a third loss period is detected following the second loss period, and a number of packets received between the second and third loss periods is less than the recovery window length, then all three loss periods and the intervening packets can be treated as a single windowed loss duration. In at least some embodiments, the length of the windowed loss duration can be extended in this way until a number of valid network packets in the packet stream are received that is greater than or equal to the recovery window length.

FIG. 1 is a system diagram depicting an example system 100 configured to monitor a stream of network packet 130 using a packet loss period expansion. The example system 100 comprises a first computing device 110 and a second computing device 120 which are both connected to a computer network 140. The first computing device 110 is configured to transmit a stream of network packets 130 to the second computing device 120 via the computer network 140.

The computer network 140 can be a local area network, a wide-area network (such as the Internet), or some combination thereof. In at least some embodiments, the computer network 140 can comprise a plurality of interconnected computing devices that are connected via wired connections, wireless connections, or some combination thereof.

The second computing device 120 is configured to receive the stream of network packets 130 via the computer network 140. The computing device 120 can be configured to receive the stream of network packets 130 via one or more communication ports that is/are connected to the computer network 140. Receiving the stream of network packets 130 can comprise receiving network data packets at the one or more communication ports and processing the network data packets as part of a sequential data transmission.

The second computing device 120 can be configured to detect a first loss of packets 131 in the stream of network packets 130. Successful transmission of data packets in the stream of network packets 130 via the computer network 140 may not be guaranteed. In the event of such scenarios, the computing device 120 can be configured to detect the loss of packets in the stream 130. For example, the packets in a network stream can be numbered using a sequential numbering system. In such an embodiment, receipt of sequential network packets that do not have sequential packet numbers can indicate a loss of one or more network packets. Additionally or alternatively, network packets in the stream 130 may arrive in a corrupted state. Corruption detection mechanisms (such as hash codes, cyclical redundancy checks, etc.) can be used by the second computing device 120 to identify corrupted packets. Such corrupted packets can be treated by the second computing device 120 as packet losses.

Subsequent to detecting the first loss of packets 131, the computing device 120 can receive an additional one or more packets 133. The additional network packets 133 can represent subsequent data packets in the stream of network packets 130 which follow one or more missing and/or corrupted packets which make up the first packet loss 131. Subsequent to receiving the additional one or more packets 133, the computing device 120 can detect a second loss of packets 135 in the stream of network packets 130. The computing device 120 can be configured to ascertain whether or not the first packet loss 131, the additional network packets 133, and the second packet loss 135 should be treated as a single packet loss period. Such a single packet loss period can be referred to as a windowed loss duration, as described herein.

Determining whether to treat the packet losses 131 and 135, and the intervening additional network packets 133 as a single packet loss period can comprise analyzing the packet losses 131 and 135 and the additional network packets 133 using a recovery window length 150. The recovery window length 150 can represent a minimum number of sequential packets that must be received in a stream of network packets (e.g., 130) following a packet loss (e.g., 131 or 135) in order to constitute a recovery from a period of loss represented by the packet loss. If the second computing device 120 determines that the number of additional packets 133 is less than the specified recovery window length 150, then the second computing device 120 can treat the first loss of packets 131, the additional packets 133, and the second loss of packets 135 as a single packet loss period. However, if the second computing device 120 determines that the number of additional packets 133 is greater than or equal to the specified recovery window length 150, then the second computing device 120 can treat the first packet loss 131 and the second packet loss 135 as separate packet loss periods.

Optionally, the example system 100 can comprise a monitoring server 160. In at least some embodiments, the monitoring server 160 can be connected to the computer network 140. The monitoring server 160 can be configured to monitor network traffic on the computer network 140. For example, the monitoring server 160 can be configured to also receive the stream of network packets 130. In at least some such embodiments, the monitoring server 160 can be configured to detect the packet losses 131 and 135, and the intervening additional network packets 133. The monitoring server 160 can be configured to determine whether or not to treat the packet losses 131 and 135, and the additional network packets 133 is a single packet loss period instead of, or in addition to, the second computing device 120.

In at least some embodiments, the monitoring server 160 can be configured to determine the specified recovery window length 150. For example, the monitoring server 160 can be configured to transmit (or cause one or more computing devices to transmit) multiple streams of network packets (not shown). The monitoring server 160 can evaluate the multiple streams of network packets with different recovery window lengths and can determine the specified recovery window length based on the evaluating. For example, the monitoring server 160 can identify a recovery window length, of the different recovery window lengths, that results in maximum packet loss durations for the multiple streams of network packets. For example, the monitoring server 160 can analyze maximum packet loss durations for the multiple streams of network packets based on the different recovery window lengths to identify a recovery window length that results in a largest maximum packet loss duration for one or more of the multiple streams of network packets. The monitoring server 160 can be configured to use this identified recovery window length as the specified recovery window length 150.

Additionally or alternatively, the monitoring server 160 can be configured to determine the specified recovery window length 150 using a single network packet stream. For example the monitoring server 160 can transmit a network packet stream (not shown) via the network 140, analyze packet loss durations for the network packet stream using multiple recovery window lengths, and select a recovery window length, of the multiple recovery window lengths, based on the packet loss durations. For example, the monitoring server 160 can identify a recovery window length, of the multiple recovery window lengths, that results in a maximum average packet loss duration for the network packet stream.

In at least some embodiments, the monitoring server 160 can be configured to dynamically adjust the specified recovery window length 150 based on the packet loss in the stream of network packets 130 and/or other streams of network packets (not shown) that are transmitted via the computer network 140. The example system 100 can comprise multiple computing devices transmitting multiple streams of network packets via the computer network 140. The monitoring server 160 can dynamically adjust the specified recovery window length 150 based on detected periods of packet loss across these multiple streams of network packets.

In at least some embodiments, the second computing device 120 and/or the monitoring server 160 can configure a packet error correction based on the single packet loss period and/or multiple packet loss periods as described herein. For example, the monitoring server 160 can be used to specify a forward error correction for the stream of network packets 130 based on the detected single packet loss period (and/or one or more other packet loss periods detected in the stream of network packets 130 and/or other streams of network packets transmitted via the computer network 140).

Additionally or alternatively, the second computing device 120 and/or the monitoring server 160 can determine a temporal separation for redundant network packet streams based on the single packet loss period and/or one or more other packet loss periods. For example, the monitoring server 160 can be used to configure a temporal separation for redundant network packet streams transmitted by the first computing device 110 based on the detected single loss period in the stream of network packets 130. The single packet loss period can be used as a delay between initial transmission times of the redundant network packet streams. In at least some scenarios, this can ensure that a packet loss period of the same length, or shorter length, as the single loss period detected in the stream of network packets 130 does not affect the same data transmitted in the redundant network packet streams.

In any of the embodiments described herein, a computing device can be a computer or server configured to transmit and/or receive data via one or more communication ports. In at least some embodiments, one or more of the computing devices 110 and 120 can be a network device, such as a switch, router, or other type of networking equipment that process network packets. Such a network device can be part of a larger network of a business or organization (e.g., part of a data center network that can comprise network fabrics, such as multi-tiered network fabrics). A network device can have a number of network ports for connecting to computing devices or other network devices. The connections between the ports of the network devices may be wired communication cables, such as wired Ethernet cables, fiber optic cables, etc. The computer network 140 can comprise one or more network devices.

In at least some embodiments, the monitoring server 160 can be a network device. Although depicted as separately connected to the network 140, in some embodiments, the monitoring server 160 can be configured as an intermediate device which received the stream of network packets 130 via the computer network 14 and transmits the stream of network packets 130 to the computing device 120.

In any of the embodiments described herein, a network packet stream can comprise a sequence of network packets that are transmitted by a computing device to one or more other computing devices. Example network packet streams include video data streams (such as video conference streams, video broadcast streams, etc.) and audio data streams (such as Voice Over IP streams, music audio streams, etc.). In at least some embodiments, a network packet stream can be a non-recoverable network packet stream, meaning that a receiver computing device cannot request retransmission of lost or corrupted packets. Examples of non-recoverable network packet streams include streams of video and/or audio of live events.

In any of the examples described herein, a windowed loss duration can be a period of packet loss defined using a recovery window length. If a set of valid packets that are received between two packet loss periods do not meet or exceed a specified recovery window length, then the periods of packet loss, and packets received between the loss periods, can be treated as a single period of packet loss. This period of packet loss can be referred to as a windowed loss duration. A windowed loss duration can be extended to cover additional loss periods as well. For example, if, after the second loss period, a third loss period is encountered, the windowed loss duration can be extended to cover the third loss period, and any packets received between the second and third loss periods, provided the number of packets received between the second and third loss periods does not meet or exceed the recovery window length. A windowed loss duration can be treated as a single loss event for the purposes of analyzing network packet stream quality of experience and/or tuning packet loss compensation mechanisms.

In any of the examples described herein, a loss period can be a number of network packets that are not received, are received in an invalid state, or some combination thereof. For example, one or more packets that are expected to arrive as part of a network packet stream, but which do not arrive, or which do not arrive before subsequent packets in the network packet stream arrive, can be treated as a packet loss duration. Additionally or alternatively, one or more packets that arrive in a corrupted state, and/or which fail to pass a validation check, can be treated as a loss period.

Figure 2:
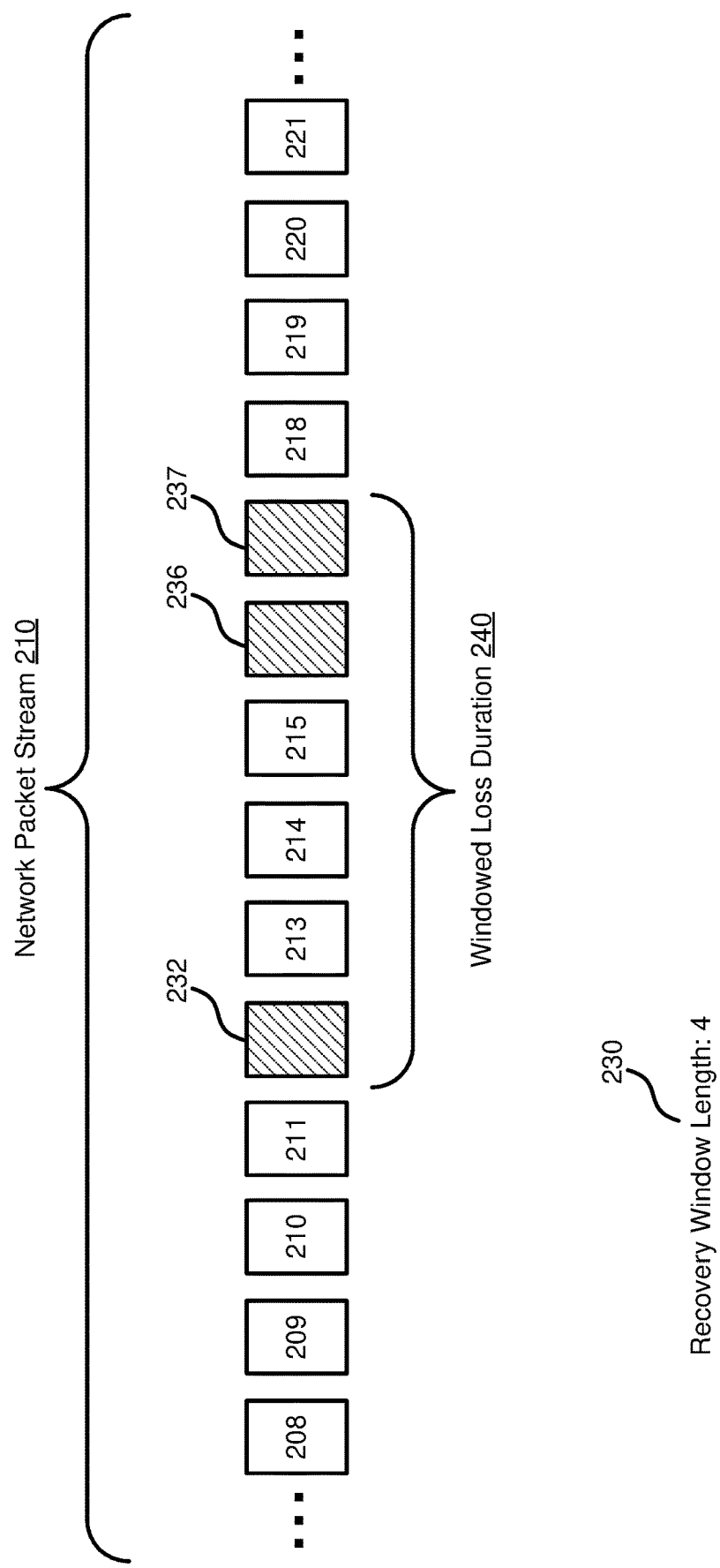
FIG. 2 is a diagram depicting an example network packet stream and an example windowed loss duration.

FIG. 2 is a diagram depicting an example network packet stream 210 and an example windowed loss duration 240. The network packet stream 210 can be received and processed by a computing device or monitoring server as described herein.

The network packet stream 210 comprises a plurality of network packets 208-221 transmitted in sequence from one computing device (not shown) to another computing device (not shown). The sequence of network packets 208-221 is depicted in FIG. 2 as being transmitted from right to left, such that packet 208 is transmitted before packet 209, which is transmitted before packet 210, etc. Two periods of packet loss are depicted in the illustration of the network packet stream 210 using lost and/or corrupted packets 232, 236, and 237. The first loss period is represented by missing and/or corrupted packet 232 and the second loss period is represented by missing and/or corrupted packets 236-237. Although the periods of loss are represented by a single missing and/or corrupted packet, and a pair of missing and/or corrupted packets, respectively, a period of loss can comprise any number of missing and/or corrupted network packets.

When receiving the network packet stream 210, a computing device can detect the missing and/or corrupt packet 232 and treat it as a first loss period. The computing device can then detect the subsequent sequence of valid packets 213-215, followed by the missing and/or corrupted packets 236-237, which the computing device can treat as a second loss period. The computing device can compare the number of intervening network packets 213-215 to a recovery window length 230. The recovery window length can represent a minimum number of sequential valid network packets that must be received in a network packet stream (e.g., 210) in order to constitute a recovery from a loss period. In the example scenario depicted in FIG. 2, the recovery window length 230 is set to a length of four sequential valid network packets. However, other recovery window lengths are possible. The size of the recovery window length can be based on a variety of factors, such as the underlying reliability of the computer network, the nature of the data being transmitted in the network packet stream 210 (and/or other network packet streams), etc. In at least some embodiments, different recovery window lengths can be specified for different network packet streams or different groups of network packet streams.

Since the number of sequential valid network packets (213-215) received between the two loss periods is less than the recovery window length 230, the missing and/or corrupted packet 221, the missing and/or corrupted packets 226-227, and the intervening network packets 213-215 can be treated as a windowed loss duration 240. In this example, the windowed loss duration 240 has a length of six (representing the number of missing and/or corrupted packets that make up the two loss periods and the number of sequential valid packets received between them). Thus, the computing device can report a single period of packet loss, having the length of the windowed loss duration 240 (six) instead of reporting two periods of packet loss, having lengths of 1 and 2, respectively.

Figure 3:
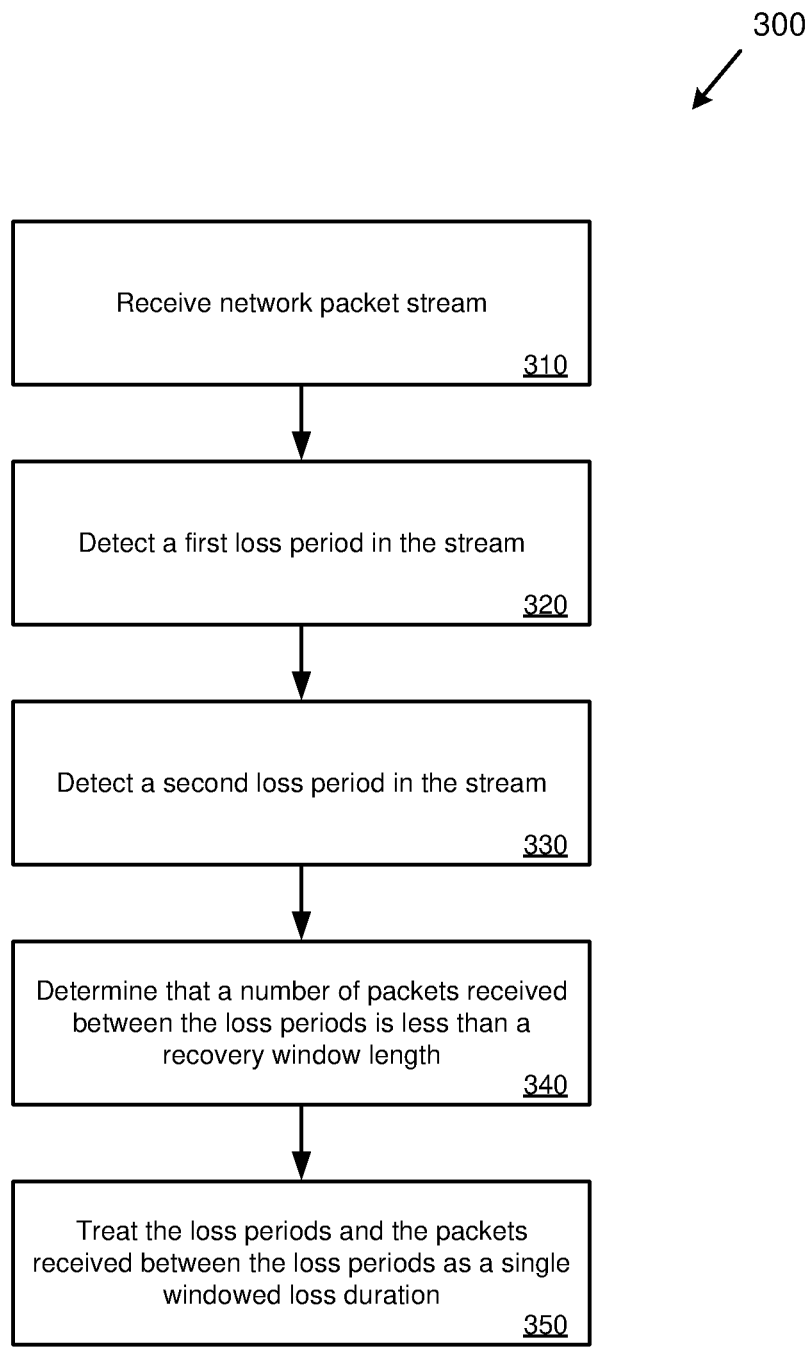
FIG. 3 is a flowchart of an example method for identifying a windowed loss duration in a network packet stream.

FIG. 3 is a flowchart of an example method 300 for identifying a windowed loss duration in a network packet stream. Any of the example computing devices described herein can be used to perform all or part of the example method 300. For example, the example computing device 410 depicted in FIG. 4 can be used to perform all or part of the example method 300.

Figure 4:
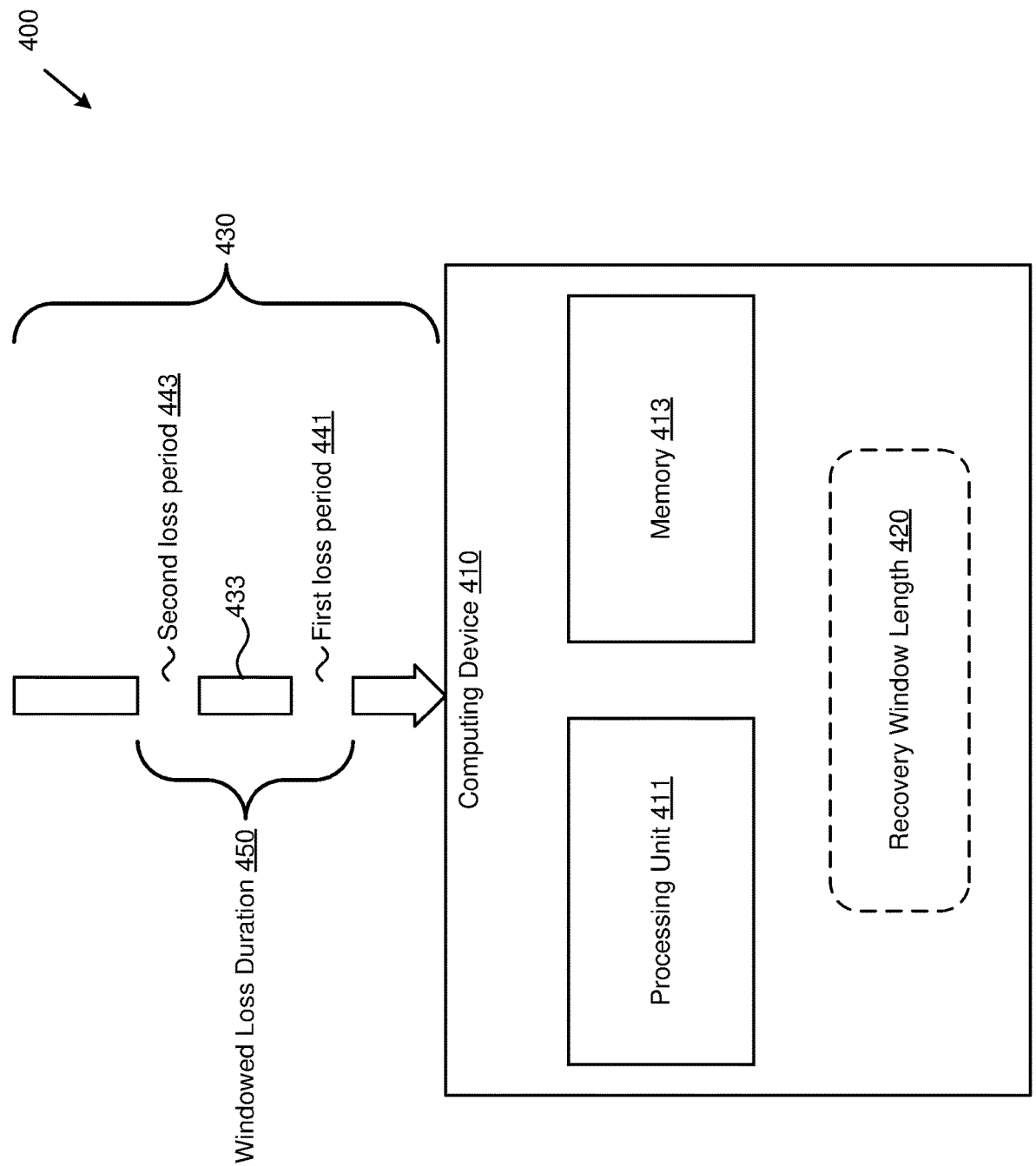
FIG. 4 is a system diagram depicting an example system comprising a computing device configured to monitor a network packet stream using a windowed loss duration.

FIG. 4 is a system diagram depicting an example system 400 comprising the computing device 410 configured to monitor a network packet stream 430 using a windowed loss duration 450. The computing device 410 comprises a processing unit 411 and a memory 413 storing instructions that, when executed by the processing unit 411, cause the computing device 410 to perform operations described herein. In at least some embodiments, the computing device 410 further comprises a recovery window length 420 that can be used to determine the windowed loss duration 450. The recovery window length 420 can be stored in the memory 413 or another memory or storage (not shown) of the computing device 410.

Referring to FIG. 3, at 310, a network packet stream is received. For example, the computing device 410 can be configured to receive the network packet stream 430 via one or more wired and/or wireless communication interfaces (not shown). In at least some embodiments, the computing device 410 can receive the network packet stream via a computer network (not shown). The network packet stream 430 can comprise a video stream, an audio stream, or the like. Other types of streaming content can also be supported.

At 320, a first loss period is detected in the network packet stream. For example, the computing device 410 can be configured to detect a first loss period 441 in the network packet stream 430. The period of loss 441 can comprise one or more missing and/or corrupted packets in the network packet stream 430. The computing device 410 can detect the first loss period 441 by determining that one or more packets in the network packet stream 430 were not received (for example, by analyzing packet numbers contained within headers of packets in the stream 430 that are assigned using a sequential numbering scheme). Additionally or alternatively, the computing device 410 can use an error detection mechanism (such as a hash algorithm or a cyclical redundancy check) to determine that one or more received network packets are not valid.

At 330, subsequent to detecting the first loss period, a second loss period is detected in the network packet stream. For example, the computing device 410 can be configured to detect a second loss period 443 in the network packet stream 430. The second loss period 443 can comprise one or more missing and/or corrupted packets in the network packet stream 430.

At 340, it is determined that a number of network packets received in the network packet stream between the first loss period and the second loss period is less than a recovery window length. For example, the computing device 410 can determine that a number of network packets 433 were received between the first loss period 441 and the second loss period 443. The computing device 410 can compare the number of packets 433 received between the two loss periods to the recovery window length 420, and can determine whether the number of packets 433 is less than the recovery window length 420.

At 350, the first loss period, the second loss period, and the network packets received between the first loss period and the second loss period are treated as a single windowed loss duration. For example, based on a determining that the number of packets 433 is less than the recovery window length 420, the computing device 410 can treat the first loss period 441, the network packets 433 received between the first loss period 441 and the second loss period 443, and the second loss period 443 as a windowed loss duration 450.

In at least some embodiments, the computing device 410 can detect additional loss periods (not shown) in the network packet stream 430, and can determine whether or not such additional loss periods and any intervening network data packets should be treated as consolidated windowed loss durations. For example, if two additional loss periods are detected, but an intervening number of network packets received between the two additional loss periods is greater than the recovery window length 420, then the computing device 410 can treat the two additional loss periods as separate periods of loss instead of a single windowed loss duration.

Additionally or alternatively, a windowed loss duration can be extended to cover more than two loss periods. For example, a third loss period can be detected following the second loss period. If a number of packets received between the second loss period and the third loss period is less than the recovery window length, then the windowed loss duration can be extended to additionally cover the third loss period and the packets received between the second and third loss periods. This process can repeat until a sequence of valid network packets is received which equals or exceeds the recovery window length.

In at least some embodiments, the example method 300 can further comprise determining the recovery window length. In at least some such embodiments, the recovery window length can be determined by transmitting multiple network packet streams and determining the recovery window length based on packet loss durations for the multiple network packet streams. For example, the computing device 410 can be configured to determine the recovery window length 420. In at least some embodiments, the computing device 410 can transmit multiple network packet streams (not shown) and evaluate the multiple network packet streams with different recovery window lengths. The computing device 410 can determine the recovery window length 420 based on the evaluating. For example, the computing device 410 can select a recovery window length, of the multiple recovery window lengths, which results in maximum packet loss durations (and/or maximum average packet loss durations) for the multiple network packet streams.

In a different or further embodiment, the recovery window length can be determined using a single network packet stream. For example, the computing device 410 can transmit a test network packet stream (not shown) via a same network over which the stream 430 is received (and/or a different network). The computing device 410 (or another computing device) can analyze packet loss durations for the test network packet stream using multiple recovery window lengths and can select a recovery window length, of the multiple recovery window lengths, based on the packet loss durations. For example, the computing device 410 can select a recovery window length which results in the largest packet loss durations (and/or largest average packet loss durations) for the test network packet stream.

In at least some embodiments, the example method 300 can further comprise modifying the recovery window length based on detected loss periods in the network packet stream. For example, the computing device 410 can be configured to change the recovery window length 420 based on the detected first loss period 441 and the second loss period 443. Additionally or alternatively, the computing device 410 can be configured to adjust the recovery window length 420 based on loss periods detected in other network packet streams (not shown).

In at least some embodiments, the example method 300 can further comprise detecting a change in the windowed loss duration (and/or other detected windowed loss durations) and transmitting an alert message based on the detected change. For example, the computing device 410 can be configured to transmit an alert message (not shown) based on the windowed loss duration 450. The computing device 410 can be configured to monitor lengths of windowed loss durations detected in the network packet stream 430. Based on a length of the windowed loss duration 450, the computing device 410 can generate the alert message. For example, the computing device 410 can be configured to compare the length of the windowed loss duration 450 to a threshold windowed loss duration length and to generate the alert message if the length of the windowed loss duration 450 is greater than the threshold windowed loss duration length. Additionally or alternatively, the computing device 410 can be configured to track an average windowed loss duration length for the network packet stream 430 and to raise the alert message if the length of the windowed loss duration 450 deviates too far from the average windowed loss duration length.

In at least some embodiments, the example method 300 can further comprise configuring a packet error correction based on the windowed loss duration. For example, the computing device 410 can configure packet error correction to be used in the network packet stream 430 (and/or other network packet streams) based on one or more windowed loss durations (e.g., 450) detected in the network packet stream 430 (and/or one or more other network packet streams). In a particular example, the computing device 410 can configure a forward error correction for one or more network packet streams based on the windowed loss duration 450. In at least some embodiments, configuring the packet error correction can comprise configuring one or more sliding windows (such as one or more automatic repeat request (ARQ) request windows) for one or more protocols.

In at least some embodiments, the example method 300 can further comprise determining a temporal separation for redundant data packet streams based on the windowed loss duration. For example, the computing device 410 can determine a temporal separation for redundant data packet streams (not shown) based on windowed loss durations detected in the network packet stream 430 (e.g., the windowed loss duration 450) and/or one or more other network packet streams received at the computing device 410. For example, the computing device 410 can use a length of the windowed loss duration 450 (and/or an average windowed loss duration for the stream 430 and/or one or more other network packet streams) as a delay between the start of one redundant data stream and the start of another redundant data stream. Thus, in at least some scenarios, windowed loss durations of similar lengths will not impact the same data in both of the redundant data streams.

Figure 5:
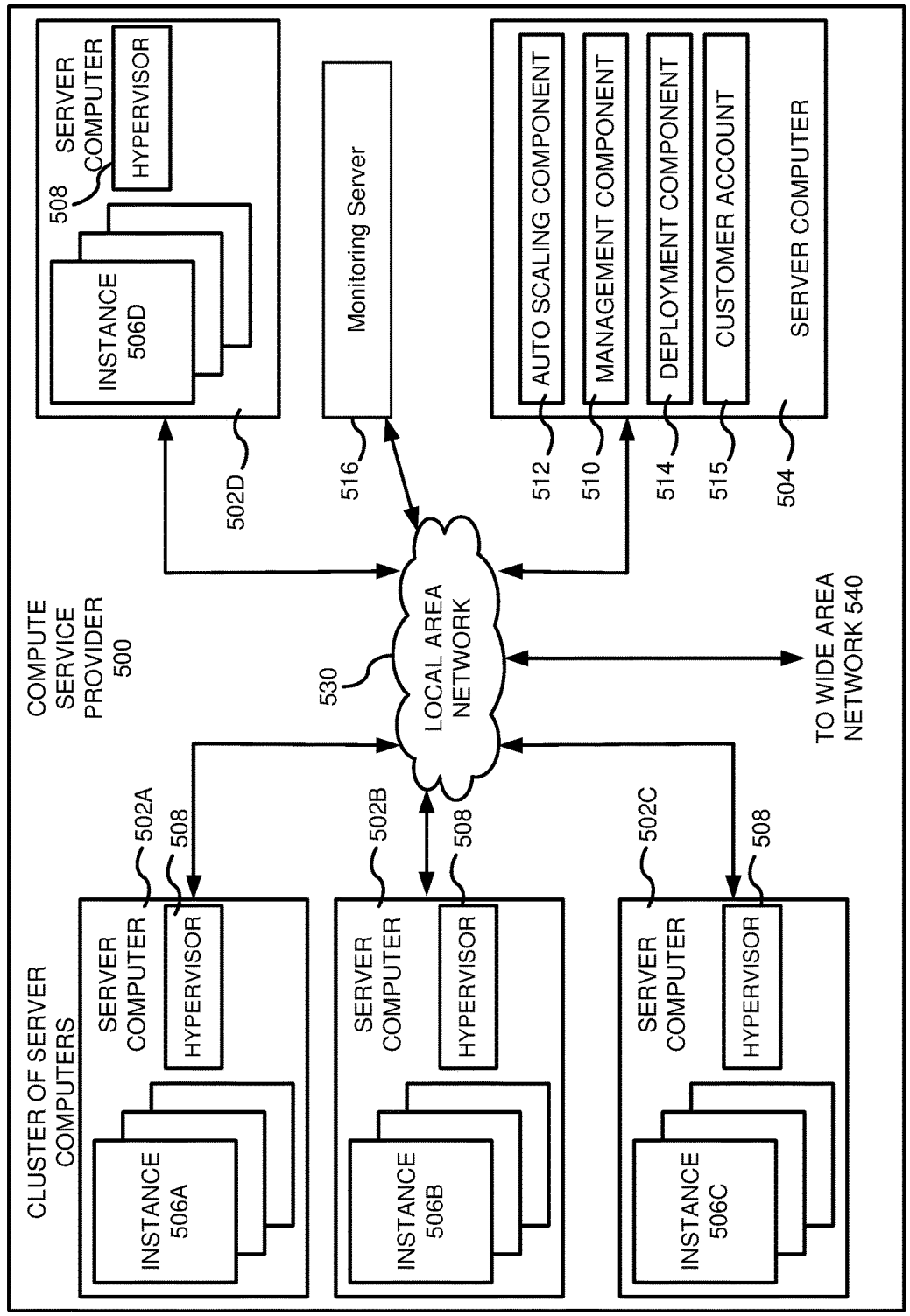
FIG. 5 is an example system diagram depicting a plurality of virtual machine instances running in a multi-tenant environment.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example, each of the servers 502A-502D can be configured to execute a hypervisor 508 or another type of program configured to enable the execution of multiple instances 506 on a single server. For example, each of the servers 502A-502D can be configured (e.g., via the hypervisor 508) to support one or more virtual machine slots, with each virtual machine slot capable of running a virtual machine instance (e.g., server computer 502A could be configured to support three virtual machine slots each running a corresponding virtual machine instance). Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can comprise Clos networks or other types of multi-tiered network fabrics. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and network devices can be utilized to interconnect the various computing systems disclosed herein.

A monitoring server 516 performs operations for using windowed loss durations to monitor network packet streams transmitted via a computer network (e.g., within the local area network 530, which can include various types of networks and network fabrics) of the compute service provider 500. For example, the monitoring server 516 can identify loss periods within packet streams transmitted by one or more of the server computers 502. For a given packet stream, the monitoring server can detect loss periods separated by one or more valid packets. The monitoring server can compare a count of the one or more valid packets to a recovery window length. If the count of valid packets is less than the recovery window length, then the monitoring server 516 can treat the loss periods and the one or more valid packets as a single windowed loss duration. For the purposes of reporting metrics, the monitoring server 516 can report the windowed loss duration as a single loss period instead of two separate loss periods. However, if the count of the one or more valid packets is greater than or equal to the recovery window length, then the monitoring server can treat the two loss periods as separate from one another.

In at least some embodiments, the monitoring server 516 can be configured to transmit (and/or to cause one or more of the server computers 502 to transmit) one or more data streams to one or more of the server computers 502 and evaluate the one or more data streams using different recovery window lengths. The monitoring server can detect maximum (and/or average) windowed loss duration(s) for the one or more data streams and can set the recovery window length equal to the recovery window length which results in the largest detected maximum (and/or average) windowed loss duration(s). Additionally or alternatively, the monitoring server 516 can be configured to dynamically adjust the recovery window length based on the frequency and/or length of detected windowed loss durations in data streams transmitted by the server computers 502.

Figure 6:
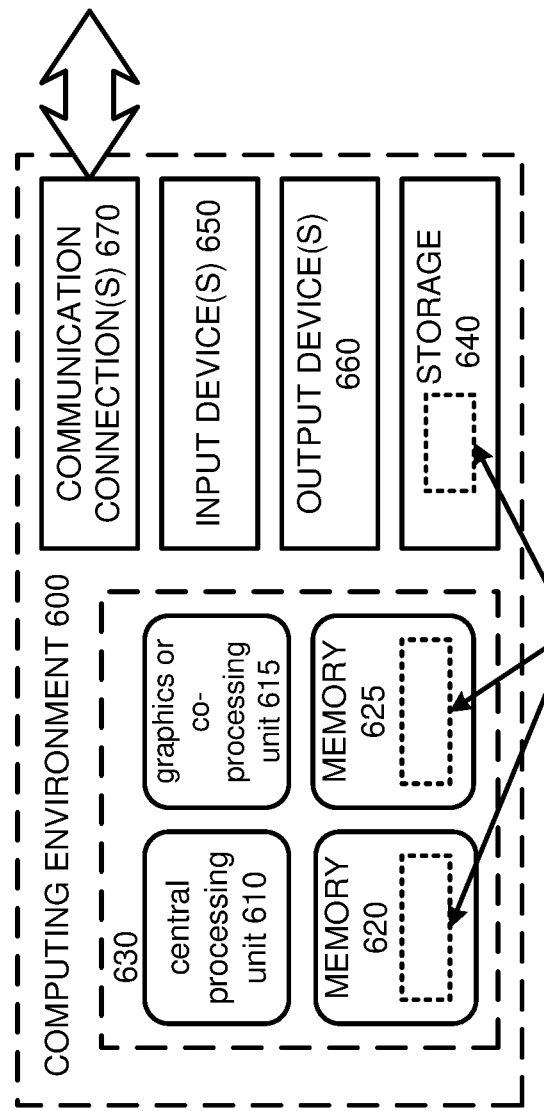
FIG. 6 is a diagram depicting a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 can store software 680 implementing one or more innovations described herein, (for example, in the form of computer-executable instructions suitable for execution by the processing unit(s)). In at least some embodiments, the computing environment 600 can comprise a computing device, server computer, or monitoring server as described herein.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 can store instructions for the software 680 implementing one or more innovations described herein (for example in a storage medium and/or firmware of the storage 640). In at least some embodiments, the tangible storage 640 can comprise one or more storages and/or one or more storage media as described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
   a first computing device connected to a computer network, wherein the first computing device is configured to transmit a stream of network packets to a second computing device via the computer network; and
   the second computing device, connected to the computer network, wherein the second computing device is configured to:
   receive the stream of network packets via the computer network;
   detect a first loss of packets in the stream of network packets;
   subsequent to detecting the first loss of packets, receive additional packets in the stream of network packets via the computer network;
   subsequent to receiving the additional packets, detect a second loss of packets in the stream of network packets;
   determine that the number of additional packets is less than a specified recovery window length, which is determined by a monitoring server computer configured to transmit multiple streams of network packets, to evaluate the multiple streams of network packets with different recovery window lengths, and to determine the specified recovery window length based upon the evaluating; and treat the first loss of packets, the additional packets, and the second loss of packets as a single packet loss period.

2. The system of claim 1, wherein the monitoring server is further configured to dynamically adjust the specified recovery window length based on monitored packet loss in the stream of network packets.

3. The system of claim 1, wherein the operations further comprise configuring a packet error correction based on the windowed loss duration.

4. The system of claim 1, wherein the operations further comprise determining a temporal separation for redundant network packet streams based on the single packet loss period.

5. A computing device comprising:
a processing unit; and
a memory storing instructions that, when executed by the processing unit, cause the computing device to perform operations, the operations comprising:
receiving a network packet stream;
detecting a first loss period in the network packet stream;
subsequent to detecting the first loss period, detecting a second loss period in the network packet stream;
determining that a number of network packets received between the first loss period and the second loss period is less than a recovery window length; and
treating the first loss period, the network packets received between the first and second loss periods, and the second loss period as a windowed loss duration;
wherein the recovery window length is determined by transmitting multiple network packet streams, by evaluating the multiple network packet streams with different recovery window lengths, and by determining the recovery window length based on the evaluating.

6. The computing device of claim 5, wherein the operations further comprise changing the recovery window length based on the detected first and second loss periods.

7. The computing device of claim 5, wherein the operations further comprise transmitting an alert message based on the windowed loss duration.

8. The computing device of claim 5, wherein the operations further comprise configuring a packet error correction based on the windowed loss duration.

9. The computing device of claim 5, wherein the operations further comprise determining a temporal separation for redundant data packet streams based on the windowed loss duration.

10. The computing device of claim 5, wherein the network packet stream comprises a stream of video data.

11. A method, comprising:
receiving a network packet stream;
detecting a first loss period in the network packet stream;
subsequent to detecting the first loss period, detecting a second loss period in the network packet stream;
determining that a number of network packets received in the network packet stream between the first loss period and the second loss period is less than a recovery window length; and
treating the first loss period, the network packets received between the first and second loss periods, and the second loss period as a single windowed loss duration;
wherein the recovery window length is determined by transmitting multiple network packet streams and by determining packet loss durations for the multiple network packet streams.

12. The method of claim 11, further comprising:
modifying the recovery window length based on detected loss periods in the network packet stream.

13. The method of claim 11, further comprising:
detecting a change in the windowed loss duration; and
transmitting an alert message based on the detected change.

14. The method of claim 11, further comprising:
configuring a packet error correction based on the windowed loss duration.

15. A computer-readable storage medium storing instructions that, when executed by a computing device, cause the computing device to perform operations, the operations comprising:
receiving a network packet stream;
detecting a first loss period in the network packet stream;
subsequent to detecting the first loss period, detecting a second loss period in the network packet stream;
determining that a number of network packets received in the network packet stream between the first loss period and the second loss period is less than a recovery window length; and
treating the first loss period, the network packets received between the first and second loss periods, and the second loss period as a windowed loss duration;
wherein the recovery window length is determined by transmitting a network packet stream and by analyzing packet loss durations for the network packet stream.

16. The computer-readable storage medium of claim 15, wherein the operations further comprise:
detecting a third loss period in the network packet stream;
determining that a number of network packets received in the network stream between the second loss period and the third loss period is less than the recovery window length; and
extending the windowed loss duration to include the network packets received in the network stream between the second loss period and the third loss period, and the third loss period.

* * * * *